United States Patent [19]
Ellis et al.

[11] Patent Number: 6,158,101
[45] Date of Patent: Dec. 12, 2000

[54] APPARATUS FOR ASSEMBLING AIR TURNING VANE AND RAIL STRUCTURES

[75] Inventors: Stanley J. Ellis, Orange; Donald H. Siiter, Yorba Linda, both of Calif.

[73] Assignee: ECO Products, Inc., Orange, Calif.

[21] Appl. No.: 09/200,551

[22] Filed: Nov. 27, 1998

[51] Int. Cl.$^7$ .................................................... B23P 19/04
[52] U.S. Cl. ............................................ 29/281.5; 29/252
[58] Field of Search .................................. 29/23.51, 252, 29/281.1, 281.5, 889.21, 889.22

[56] References Cited

U.S. PATENT DOCUMENTS

| | | | |
|---|---|---|---|
| 856,630 | 6/1907 | Green | 29/23.51 |
| 3,455,008 | 7/1969 | Harper | 29/889.21 |
| 5,068,957 | 12/1991 | Felson | 29/566 |
| 5,181,314 | 1/1993 | Lyons et al. | 29/796 |
| 5,233,752 | 8/1993 | Lyons | 29/796 |
| 5,529,092 | 6/1996 | Arnoldt | 138/39 |

FOREIGN PATENT DOCUMENTS 203563  4/1966  Sweden .............................. 29/889.21

*Primary Examiner*—S. Thomas Hughes
*Assistant Examiner*—Eric Compton
*Attorney, Agent, or Firm*—William L. Chapin

[57] ABSTRACT

An apparatus for assembling air turning vane and rail structures of the type having a plurality of turning vanes consisting of longitudinally spaced apart curved airfoil plates disposed between a pair of parallel upper and lower plate-like rails, and used to promote laminar air flow in heating, ventilating and air conditioning ducts, compresses an array of vanes between a pair of rails to interlock upper and lower transverse edges of the vanes with the upper and lower rails. The apparatus includes a work table for holding the lower rail of a vane and rail structure to be assembled, and lower and upper laterally disposed comb-like vane guides disposed above the work table provided with laterally spaced apart, vertically aligned pairs of slots, each adapted to receive a vane in an upstanding position above an intended fastening location in the lower rail. A ram plate driven downwardly by a linear actuator presses downwardly on an upper rail placed in position above the upper transverse ends of the vanes, causing the upper transverse ends of the vanes to lockingly engage with the upper rail, and to couple downward translational motion of the ram plate and upper rail into downward motion of the lower transverse edge walls of the vanes, causing the latter to lockingly engage the lower rail.

23 Claims, 9 Drawing Sheets

APPARATUS FOR ASSEMBLING AIR TURNING VANE AND RAIL STRUCTURES

BACKGROUND OF THE INVENTION

A. Field of the Invention

The present invention relates to duct work used to convey air to heat, ventilate or air condition (HVAC) commercial, industrial and residential buildings. More particularly, the invention relates to an apparatus for use in the fabrication of air turning vane and rail structures having a plurality of vanes, fastened between a pair of rails, which are used to smooth air flow in HVAC ducts.

B. Description of Background Art

Flowing air used to ventilate, heat, or cool buildings is typically routed through a network of interconnected, elongated tubes or ducts which are collectively referred to as duct work. The ducts may have a rectangular, round or oval cross section. Changes in the orientation or directional bearing of ducts are usually effected by coupling a pair of ducts together by means of an angled transition section or elbow. These are bent at an angle, typically of 90 degrees, and have rectangular or circular openings for attachment to separate upstream and downstream ducts oriented at the particular bend angle with respect to one another.

When air flowing through a duct impacts a side wall of an elbow or transition section which is disposed perpendicularly to the flow direction, substantial turbulence may be created in the flowing air mass, even when the flow velocity is relatively modest. This turbulence impedes air flow, causing an increase in static pressure and pressure loss coefficients, thus necessitating the use of larger blowers that consume increased drive power, to maintain a given air flow rate at the outlet of the elbow section. Moreover, undesirable vibration and noise may be generated within the duct work, if the turbulence is sufficiently great.

For the reasons stated above, HVAC elbows or transition sections often are fitted with internal air turning assemblies which minimize turbulence by encouraging laminar flow within the elbow. Air turning assemblies designed to be installed within ventilation elbows to minimize turbulence typically employ a plurality of curved, parallel blades or turning vanes spaced apart at regular intervals, to promote laminar air flow where the direction of air flow changes within the elbow. Typical turning vane structures are fabricated from a plurality of curved sheet metal vanes fastened between a pair of flat, parallel metal sheets, often referred to as rails. Usually, such air turning vane and rail structures are fabricated externally, shipped to a job site, and secured within an angled transition section or elbow as required.

Turning vane assemblies which employ a variety of techniques for fastening turning vanes to rails has been disclosed in the following U.S. patents:

Steffens, U.S. Pat. No. 2,292,246, Aug. 4. 1942, Duct Turn, Speiser, U.S. Pat. No. 2,826,221, Mar. 11, 1958, Duct Devices, Gracer, U.S. Pat. No. 2,861,597, Nov. 25, 1958, Air Guide Device, Gracer, U.S. Pat. No. 2,861,597, Nov. 25, 1958, Air Guide Device, Perlin, U.S. Pat. No. 2,884,956, May 5, 1959, Air Guide Device, Gracer, U.S. Pat. No. 2,959,195, Nov. 8, 1960, Air Guide Device, Chesser, U.S. Pat. No. 3,050,160, Aug. 21, 1962, Sheet Metal Connection And Method For Effecting Same, Noll, U.S. Pat. No. 3,075,450, Jan. 29, 1963, Cap Assembly, Bohannon, U.S. Pat. No. 3,144,204, Aug. 11, 1964, Centrifugal Blower Wheel, Olmsted, et al., U.S. Pat. No. 3,224,668, Dec. 21, 1965, Blower Wheel Wedged End Blade Mounting, Jacobsen, U.S. Pat. No. 3,381,713, May 7, 1968, Turning Vane And Rail Construction, Harper, U.S. Pat. No. 3,405,737, Oct. 15, 1968, Duct Device, Hinden, U.S. Pat. No. 3,494,379, Feb. 10, 1970, Air Turning Assembly And Mounting Rail, Hinden, U.S. Pat. No. 3,602,262, Aug. 31, 1971, Air Turning Assembly, Myers, U.S. Pat. No. 4,467,829, Aug. 28, 1984, Turning Vane Rail, DeLord U.S. Pat. No. 4,641,684, Feb. 10, 1987, Rail For An Air Turning Vane Assembly, Myers, U.S. Pat. No. 4,911,205, Mar. 27, 1990, Apparatus And Method For Duct Vane Mounting, Felson, U.S. Pat. No. 5,068,957, Dec. 3, 1991, Turning Vane Setting Tool, Lyons. et al., U.S. Pat. No. 5,181,314, Jan. 26, 1993, Apparatus For Manufacturing Air Turning Assembly.

Vane and rail assemblies known to the present inventors, including those cited above, generally require that mating portions of sheet metal vanes or rails which are to be joined together be deformed by robustly pounding parts thereof, using either a hammer, chisel, or specially designed tools, to fasten the vanes and rails together. Sometimes, pounding on a vane and rail assembly to install a series of vanes can loosen the fastening of vanes installed earlier. Then, when a completed vane and rail assembly has been installed into a duct work elbow; and the latter installed in a building, variations in the pressure of air flowing through the duct work can cause the "cheeks" or walls of curved transition sections to expand and contract, and perpendicular duct walls to flex inward and outward or "oil-can" in response to air pressure fluctuations. Since environmental control systems for buildings require that air flow be turned on and off intermittently, or varied by control dampers, duct work air turning vane assemblies are routinely subjected to such wall deformations. As a result, vanes which had been initially loosened during the fabrication of a turning vane and rail assembly can become completely detached from the rails long after duct work has been installed in a building. As can be readily appreciated, replacing dislodged turning vanes can be an extremely time consuming, laborious and expensive process, particularly in high-rise buildings.

Partly in response to limitations of prior art air turning vane and rail assemblies, the present inventors developed improved air turning vane and rail assemblies of simplified construction and greater versatility than existing assemblies, in which vanes self-lock into engagement with rails, thereby minimizing the likelihood of vanes dislodging from a vane and rail assembly. Those improved turning vane and rail assemblies are disclosed in the present inventors co-pending application Ser. No. 08/912,385, now U.S. Pat. No. 5,927,339, filed Aug. 18, 1997 now U.S. Pat. No. 5,927,339, issued Jul. 27, 1999. The disclosure of that application is hereby incorporated by reference into the present disclosure.

An embodiment of an air turning vane and rail assembly according to the co-pending disclosure includes a pair of laterally spaced apart parallel rails. Each of the rails has a plurality of longitudinally spaced apart, generally trapezoidally-shaped tabs, each bent perpendicularly inwardly towards the opposite rail from a separate perforation through the rail. Each of the upstanding tabs has through its thickness an aperture located near the base of the tab. A plurality of self-gripping double air-foil vanes lockingly engage the tabs, each vane having a generally hemispherically shaped protuberance which protrudes forward through the aperture from a rear concave air-foil plate towards a front convex airfoil plate. In this embodiment the protuberance has an inner flat, transversely disposed lip which locks against the upper wall of the aperture through the tab, when the tab is forcibly inserted into the opening between the front and rear airfoil plates of a vane.

In other co-pending patent applications, Ser. No. 09/129,507 filed Aug. 5, 1998 and Ser. No. 09/153,205, filed Sep. 15, 1998. the present inventors disclosed a Method and Apparatus For Making Self-Gripping Air Turning Vanes of the type described in application Ser. No. 08/912,385.

The present invention was conceived of to provide an apparatus for assembling air turning vanes and rails, particularly those described in application Ser. No. 08/912,385, into finished air turning structures.

OBJECTS OF THE INVENTION

An object of the present invention is to provide an apparatus for assembling air turning vane and rail structures.

Another object of the invention is to provide an apparatus for assembling air turning van and rail assemblies in which a plurality of air turning vanes are fastened at opposite transverse ends thereof to a pair of elongated plates, referred to as rails.

Another object of the invention is to provide an apparatus for assembling air turning vane and rail assemblies in which a pair of parallel longitudinally disposed rails may be simultaneously fastened to opposite ends of a plurality of longitudinally spaced apart air turning vanes disposed perpendicularly between the rails.

Another object of the invention is to provide an apparatus for assembling a plurality of parallel, spaced apart air turning vanes disposed perpendicularly between a pair of flat rails to form an air turning vane and rail structure, the vanes and rails being of a type which self-grip or interlock with each other when pressed together.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, we do not intend that the scope of our exclusive rights and privileges in the invention be limited to details of the embodiments described. We do intend that equivalents, adaptations and modifications of the invention reasonably inferable from the description contained herein be included within the scope of the invention as defined by the appended claims.

SUMMARY OF THE INVENTION

Briefly stated, the present invention comprehends an apparatus for assembling air turning vane and rail structures in which a plurality of parallel, longitudinally spaced apart air turning vanes are attached at upper and lower ends thereof to a pair of parallel upper and lower rails, respectively, which are longitudinally elongated and perpendicularly disposed to the vanes.

According to the present invention, an apparatus for assembling air turning vane and rail structures utilizes vanes and rails which interlock with one another when pressed together. The preferred embodiment of the apparatus utilizes a pair of rails, each of which has a plurality of longitudinally spaced apart, generally trapezoidally-shaped tabs, each bent perpendicularly inwardly towards the opposite rail from a separate perforation through the rail. Each of the upstanding tabs has through its thickness an aperture located near the base of the tab. A plurality of self-gripping, double airfoil vanes adapted to lockingly engage the tabs each has a pair of generally hemispherically-shaped, button-like protuberances, one each of which is located near the upper and lower transverse edge walls of the vane. Each button protrudes forward from a rear concave air-foil plate towards a front convex airfoil plate. When a rail tab is forcibly inserted into the opening between the front and rear airfoil plates of a vane, the protuberance snaps forward through the tab aperture, whereupon an inner flat, transversely disposed lip of the protuberance locks against the upper wall of the aperture through the tab.

The apparatus according to the present invention includes a bed or work table having a flat upper surface for holding the lower rail of a vane and rail structure which is to be assembled. A first, lower laterally disposed comb-like vane guide comprising essentially a laterally elongated rectangular plate having a plurality of slots protruding inwards from the front edge thereof, alternating with uncut web portions which form ribs between the notches, is located parallel to and above the work table. Each slot is adapted to receive and help maintain in a vertical plane a vane which has been placed on top of a trapezoidally-shaped vane engagement tab which protrudes upwards from a first, lower rail placed on the work table. In the preferred embodiment, the lower vane guide and work table are attached to one another and slidably adjustable in unison to a selected height and securable thereat, to accommodate vanes of different heights.

A preferred embodiment of the vane and rail structure assembling apparatus according to the present invention, includes a second, upper laterally disposed comb-like vane guide, substantially identical in structure and function to the lower vane guide. The upper vane guide is disposed above and parallel to the lower vane guide and work table, at a distance above the work table slightly less than the selected vane height. Thus, when a second, upper rail is placed in position above the upper transverse ends of a plurality of vanes protruding upwards through the slots in the upper vane guide, with each trapezoidal tab of the upper rail protruding downward and protruding into the upper opening of a separate vane, the rail is located above the upper vane guide.

Included in the apparatus according to the present invention is a linear actuator provided with a cylinder, preferably powered by pressurized air, having a downwardly protruding piston rod attached at the lower end thereof to a ram plate. The ram plate has a laterally elongated rectangular shape which spans the width of the upper and lower vane guides, and has a flat lower surface which is located above and parallel to the upper surface of the upper comb guide. When the actuator cylinder is pressurized, a piston within the cylinder is forced downwards, causing the ram plate to be forced downward to a height above the work table equal to the height of the vanes plus the thickness of the upper and lower rails. Thus, actuation of the ram cylinder presses upper and lower rail tabs into locking engagement within upper and lower ends, respectively, of each vane, thereby resulting in a completely assembled air turning vane and rail assembly. De-pressurization of the actuator cylinder causes the ram plate to be retracted to its original height, allowing the assembled vane and rail structure to be removed from the apparatus by pulling the completed structure forward from the vane guide slots, whereupon rails and vanes of a next structure to be assembled may be placed in the slots.

DETAILED DESCRIPTION OF THE PREFERRED EMBODIMENTS

FIGS. 1–10 illustrate an apparatus according to the present invention for assembling air turning vane and rail structures.

Figure 1:
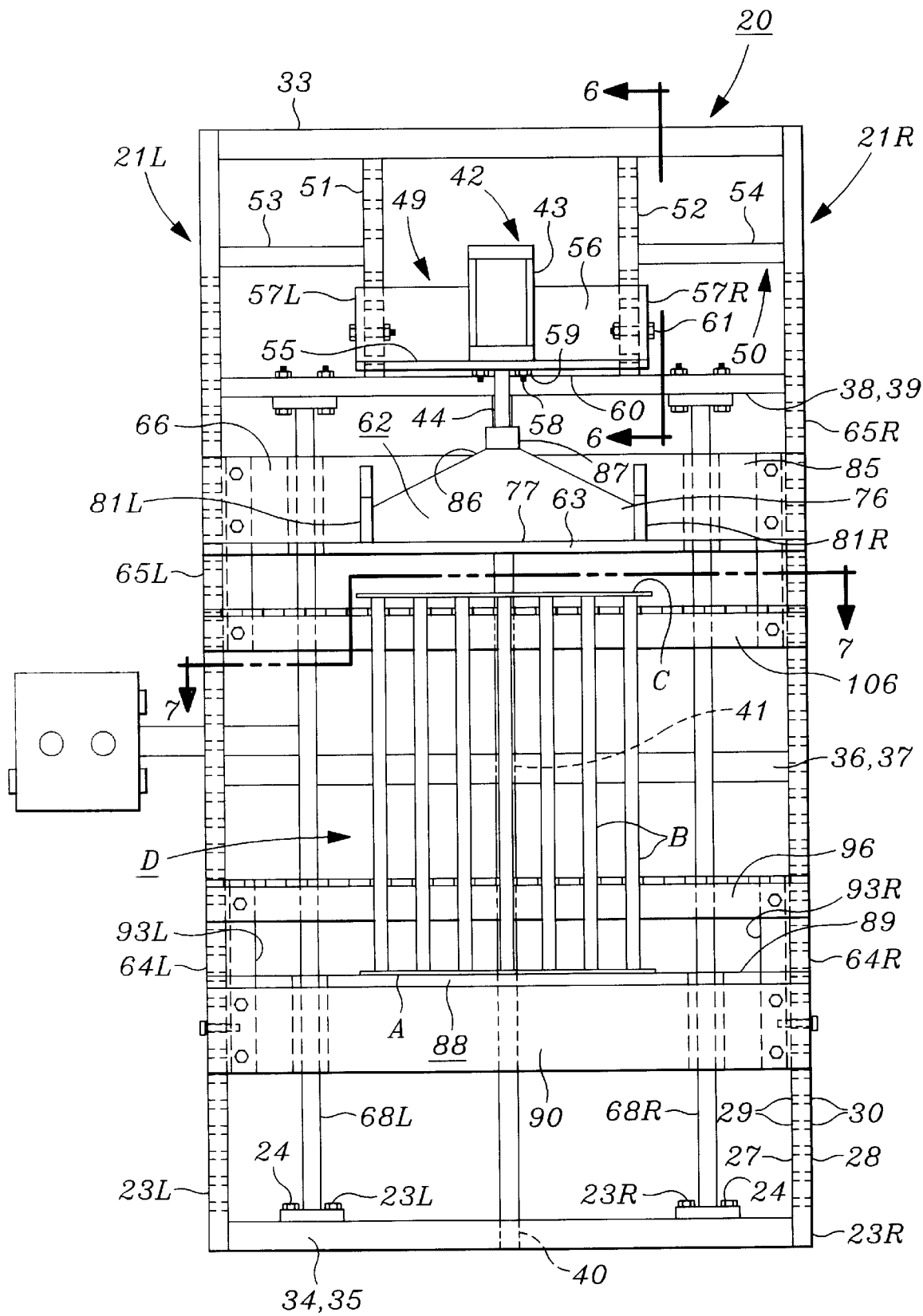
FIG. 1 is a front elevation view of an apparatus for assembling air turning vane and rail structures according to the present invention, showing on the work table thereof an assembled air turning structure having relatively long vanes.
Figure 2:
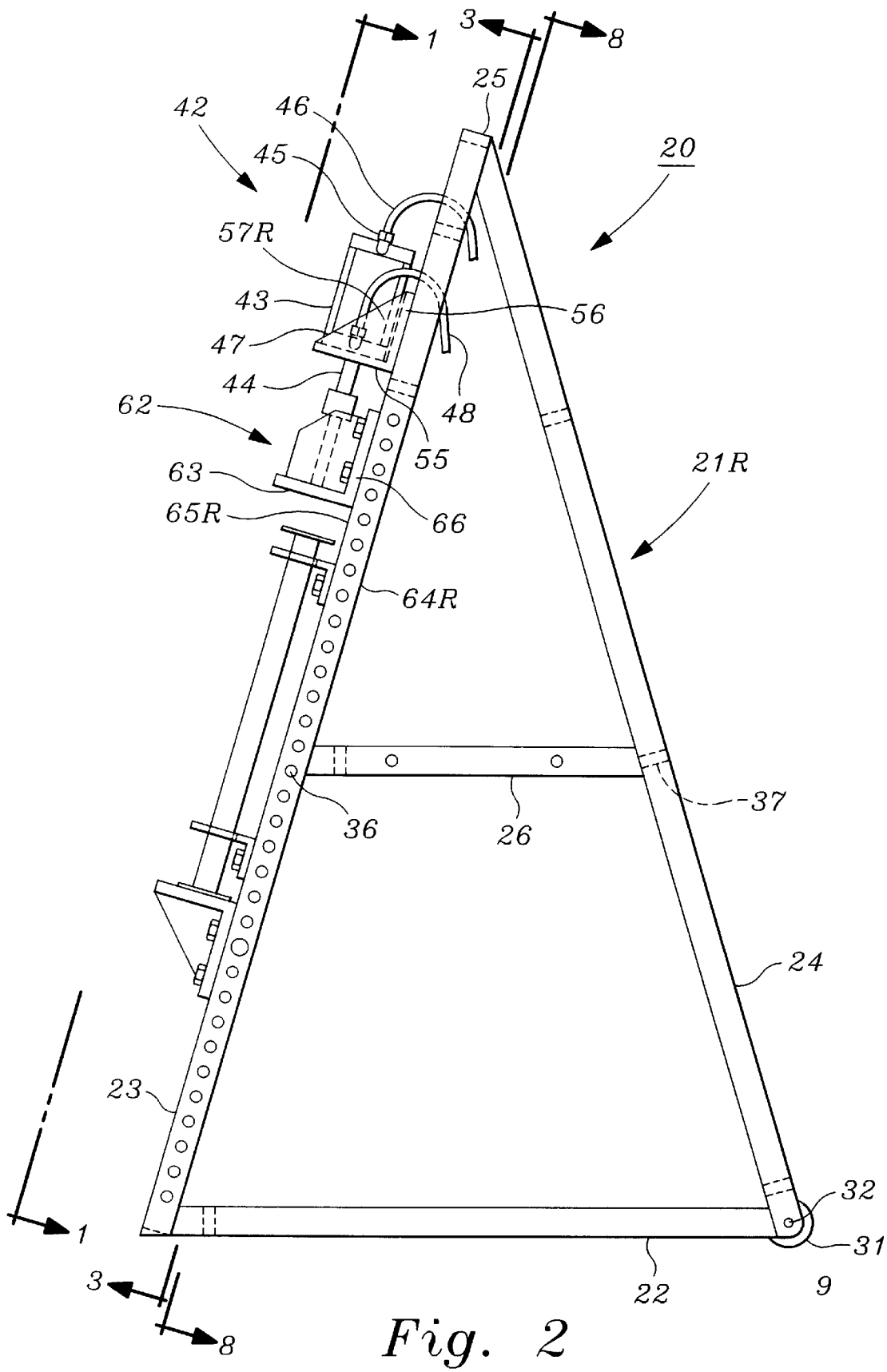
FIG. 2 is a right side elevation view of the apparatus of FIG. 1.
Figure 3:
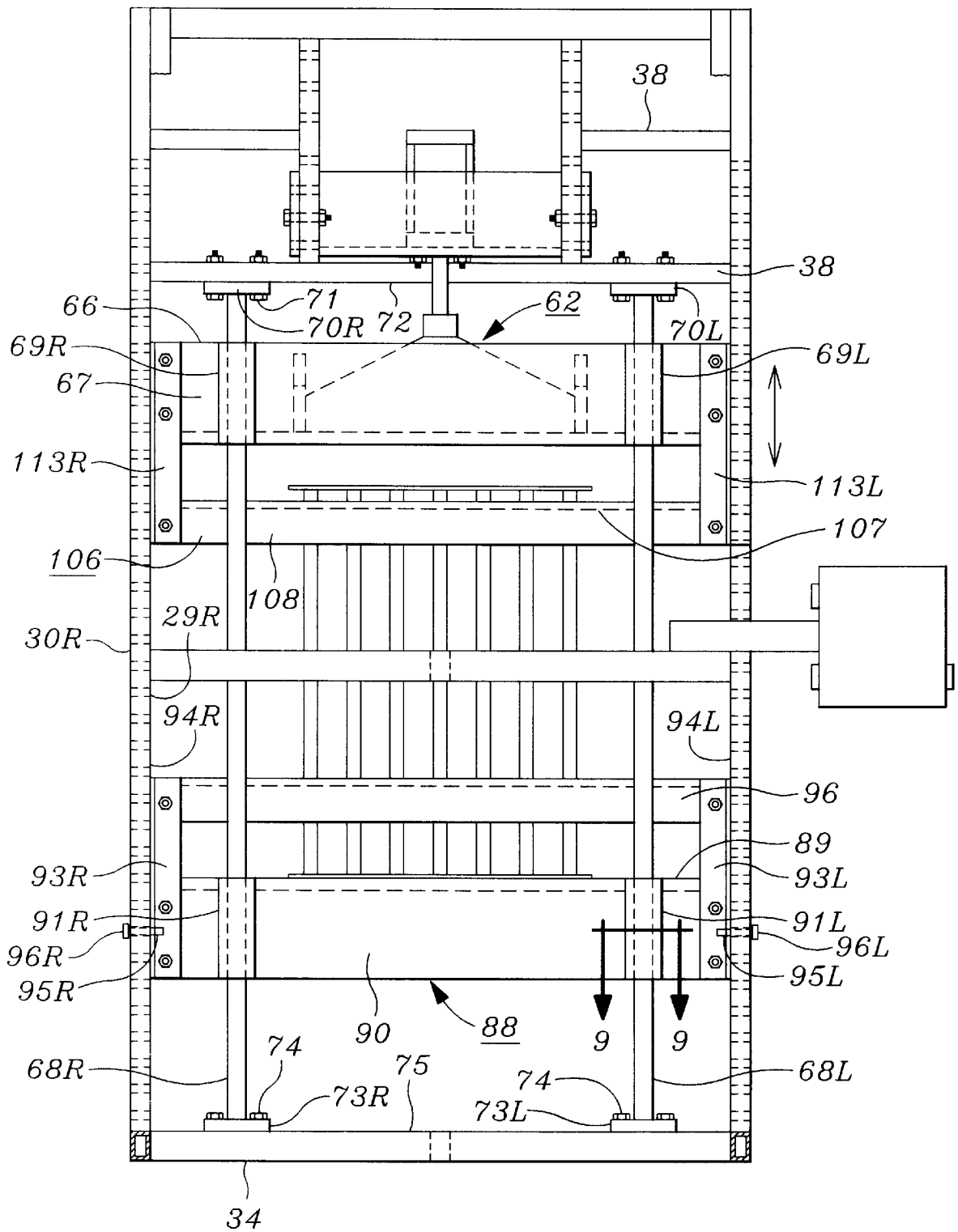
FIG. 3 is a rear sectional view showing a front portion of the apparatus of FIG 2, taken along line 3—3.

Referring first to FIGS. 1–3, an air turning vane and rail assembling apparatus 20 according to the present invention may be seen to include left and right A-frame structures 21L and 21R each having in side elevation view the shape of an isosceles triangle. Each A-frame 21L, 21R includes a straight horizontal base member 22 disposed in a fore and aft direction, a front straight diagonal member 23 which angles upwardly and rearwardly from the front end of the base member, and a rear straight diagonal member 24 which angles upwardly and forwardly from the rear end of the base member. Front and rear diagonal members 23 and 24 intersect at the upper vertex 25 of A-frame 21. As shown in FIG. 2, A-frame 21 includes an intermediate straight, horizontally disposed fore and aft member 26 located approximately midway between base member 22 and upper vertex 25.

The structural members of A-frame 21 described above may be made of any suitably rigid and strong material, and fastened to one another by any suitable means. In a preferred example embodiment of apparatus 20, A-frames 21 were constructed of lengths of square cross-section tubular steel stock fastened together by welded joints.

As shown in FIGS. 1 and 2, inner and outer lateral sides 27 and 28 of front diagonal frame members 21 preferably contain a plurality of longitudinally spaced apart, laterally aligned holes 29 and 30, respectively. The function of these holes will be described below.

As may be seen best by referring to FIG. 2, A-frames 21 of apparatus 20 may optionally each include wheels 31 located at the intersection of the rear end of base member 22, and rear diagonal member 24, each wheel being fastened to the base member by a transversely disposed axle 32.

Referring now to FIGS. 1 and 3 in addition to FIG. 2, apparatus 20 may be seen to include an upper straight laterally disposed horizontal cap beam member 33. Apparatus 20 also includes a front base beam member 34 disposed laterally between the junctions of left A-frame base member 22L and front diagonal member 23L, at the left end of the front base beam member and to the junction of right A-frame base member 22R and front diagonal member 23R, at the right end of the front base beam member. Similarly, a rear base beam member 35 is disposed laterally between the intersections of left rear diagonal member 24L and left fore and aft base member 22L, at the left end of rear base beam member 35, and the junction of right A-frame diagonal member 24R and right fore and aft member 22R, at the right end of rear base beam member 35.

As may be seen best by referring to FIGS. 1 and 3, apparatus 20 includes a front transversely disposed, intermediate height structural reinforcing member 36 disposed laterally between left and right front diagonal A-frame members 23L and 23R. As may be seen best by referring to FIG. 8, apparatus 20 also includes a rear transversely disposed intermediate height structural reinforcing member 37 disposed laterally between left and right rear diagonal A-frame member 24L and 24R.

Referring again to FIGS. 1, 3 and 8, apparatus 20 may be seen to include front and rear upper structural beam members 38 and 39, respectively, disposed between front diagonal members 23L and 23R, and rear diagonal members 24L and 24R, respectively, of left and right A-frames 21L and 21R.

Figure 8:
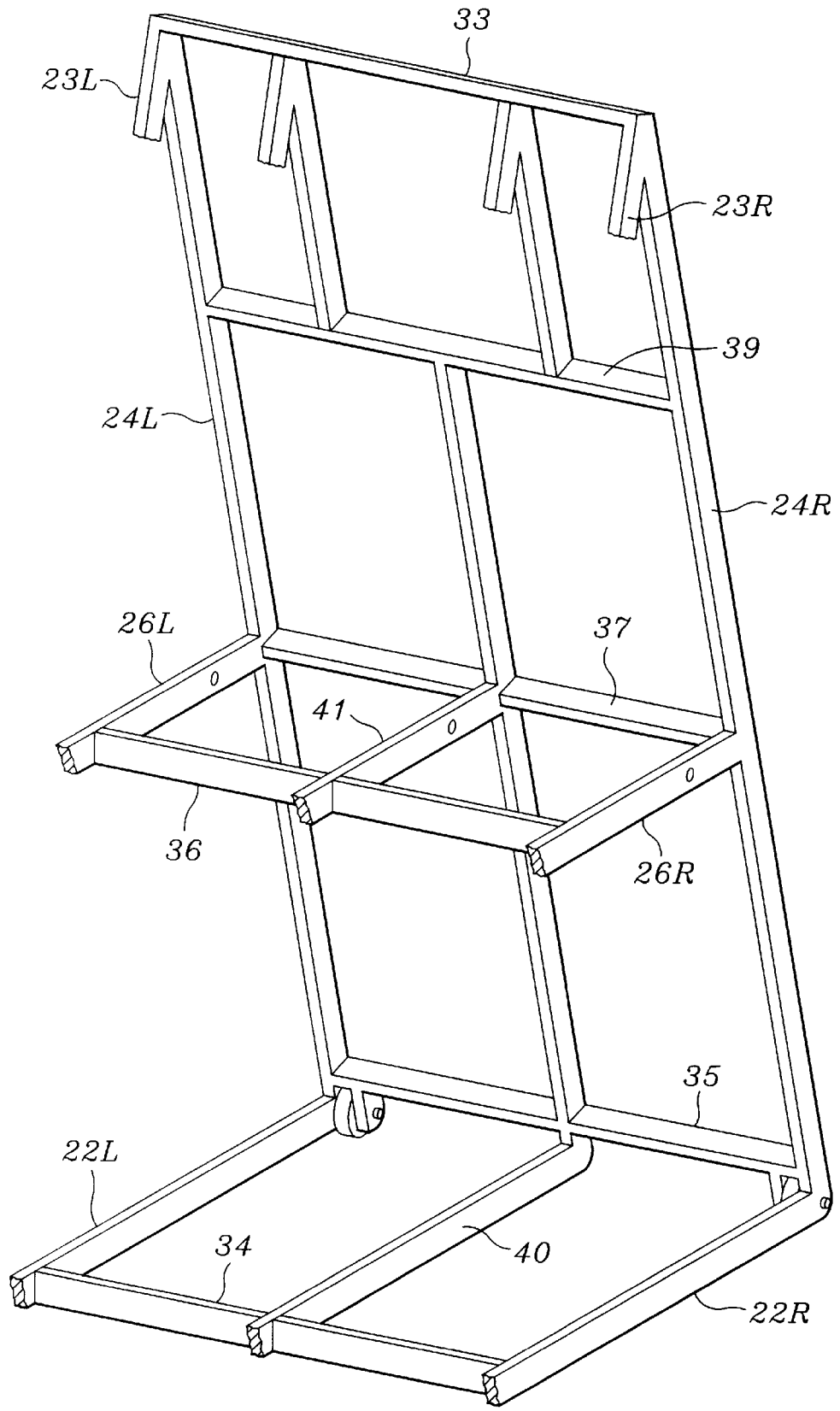
FIG. 8 is a fragmentary perspective view of a rear portion of the apparatus of FIG. 2, taken along line 8—8.

As may be seen best by referring to FIG. 8, apparatus 20 also includes a lower, base frame structural member 40 disposed longitudinally, or in a fore and aft direction, between front base beam member 34 and rear base beam member 35. Longitudinal base beam member 40 is located laterally midway between left and right A-frames 21L and 21R. As is also shown in FIG. 8, apparatus 20 also includes an intermediate height longitudinal structural member 41 located midway between left and right A-frames 21L and 21R and disposed between front and rear intermediate transverse structural members 36 and 37, respectively.

Referring now to FIGS. 1–3, apparatus 20 may be seen to include a linear actuator 42 having a line of action parallel to front diagonal A-frame members 23L and 23R. Preferably, linear actuator 42 is of the pneumatic type, including a cylinder 43 containing a piston (not shown) connected to a piston rod 44 which protrudes downwardly from the cylinder. Actuator 42 also includes a downstroke pressure port 45 and air supply hose 46, and an up-stroke pressure port and air supply hose 47 and 48, respectively. As shown in FIGS. 1 and 2, actuator cylinder 43 is mounted on a support structure 49 which is in turn fastened to a support frame 50. The latter comprises in combination with upper transversely disposed frame member 38 two laterally spaced apart vertically disposed left and right members 51 and 52, respectively, which are attached to and protrude upwardly from front upper transversely disposed frame member 38, and which are fastened at the upper ends thereof to cap beam member 33.

Preferably, cylinder support frame 50 is strengthened by a pair of left and right horizontal frame support members 53 and 54 disposed between left front diagonal A-frame member 23L and vertical frame member 51, on the left side, and between right vertical frame member 52 and right frame diagonal A-frame member 23R, respectively.

Referring still to FIGS. 1 and 2, it may be seen that cylinder support structure 49 includes a laterally disposed base plate 55 which protrudes forward from a rear perpendicularly disposed backing plate 56. As may be seen best by referring to FIGS. 1 and 2, cylinder support structure 49 preferably includes left and right fore and aft disposed triangular reinforcing gusset plates 57L and 57R joined to outer perpendicularly intersecting left and right edge walls of base plate 55 and rear backing plate 56.

As may be seen best by referring to FIG. 1, actuator cylinder 43 is fastened to cylinder support structure base plate 55 by means of longitudinally disposed cylinder tie rods 58 which protrude downwardly from the cylinder through holes provided through the base plate, and nuts 59 tightened on threaded ends of the tie rods against lower surface 60 of the base plate. Cylinder support structure 49 is fastened to left and right vertical members 51 and 52 of cylinder support frame 50 by suitable means, such as by bolts 61.

Referring now to FIGS. 1 and 2, it may be seen that apparatus 20 includes a laterally disposed ram 62 attached to the lower end of actuator piston rod 44. Ram 62 includes a bottom laterally elongated rectangularly-shaped anvil plate 63 which spans the distance between outer longitudinal side walls 64L and 64R of front A-frame diagonal members 23L and 23R, the anvil plate protruding perpendicularly forward with respect to front longitudinal walls 65L and 65R of the front diagonal A-frame members. Ram 62 also includes a laterally elongated rectangularly-shaped rear support plate 66 which depends perpendicularly upwards from the rear edge wall of anvil plate 63. As may be seen best by referring to FIG. 2, the outer edge portion of rear surface 67 of rear support plate 66 is located parallel to and slightly forward of front diagonal A-frame member front surfaces 65L and 65R, allowing relative parallel slidable movement between the ram support plate and the A-frame members.

As may be seen best by referring to FIGS. 1 and 3, rear ram support plate 66 is slidably mounted in an up and down direction relative to apparatus 20, by a pair of vertically elongated, laterally spaced apart bearing rods 68L and 68R on which are slidably mounted linear bearing assemblies 69L, 69R which are fastened to rear surface 67 of rear ram support plate 66. As shown in FIGS. 1 and 3, bearing rods 68L, 68R are provided with upper mounting flanges 70L, 70R, which are fastened by laterally spaced apart bolts 71 to the lower surface 72 of front upper transverse frame member 38. The lower ends of bearing rods 68L, 68R are provided with lower mounting flanges 73L, 73R which are fastened by bolts 74 to the upper surface 75 of front laterally disposed base beam member 34.

Referring now to FIGS. 1–3, it may be seen that ram 62 includes a coupling plate 76 which protrudes perpendicularly upwards from the upper surface 77 of ram anvil plate 63. As shown in the figures, coupling plate 76 has a generally trapezoidal shape with parallel vertically disposed side walls 78L, 78R located equidistant from outer side walls 79L, 79R of ram rear support plate 66. Outer edge walls 78L, 78R of ram coupling plate 76 are secured to the inner facing vertically disposed face walls 80 of a pair of buttress plates 81L, 81R. Buttress plates 81L, 81R have a lower edge wall 82L, 82R, and a rear edge wall 83L, 83R which are secured to upper surface 87 of anvil plate 63, and front surface 85 of rear anvil support plate 66, by welded joints or other suitable fastening means.

As shown in FIG. 1, the vertically located upper vertex area 86 of coupling plate 76 has protruding vertically upwards therefrom a block 87 bolted at the lower end thereof to the coupling plate, and at the upper end thereof to the lower end of piston rod 44.

Figures 4, 5:
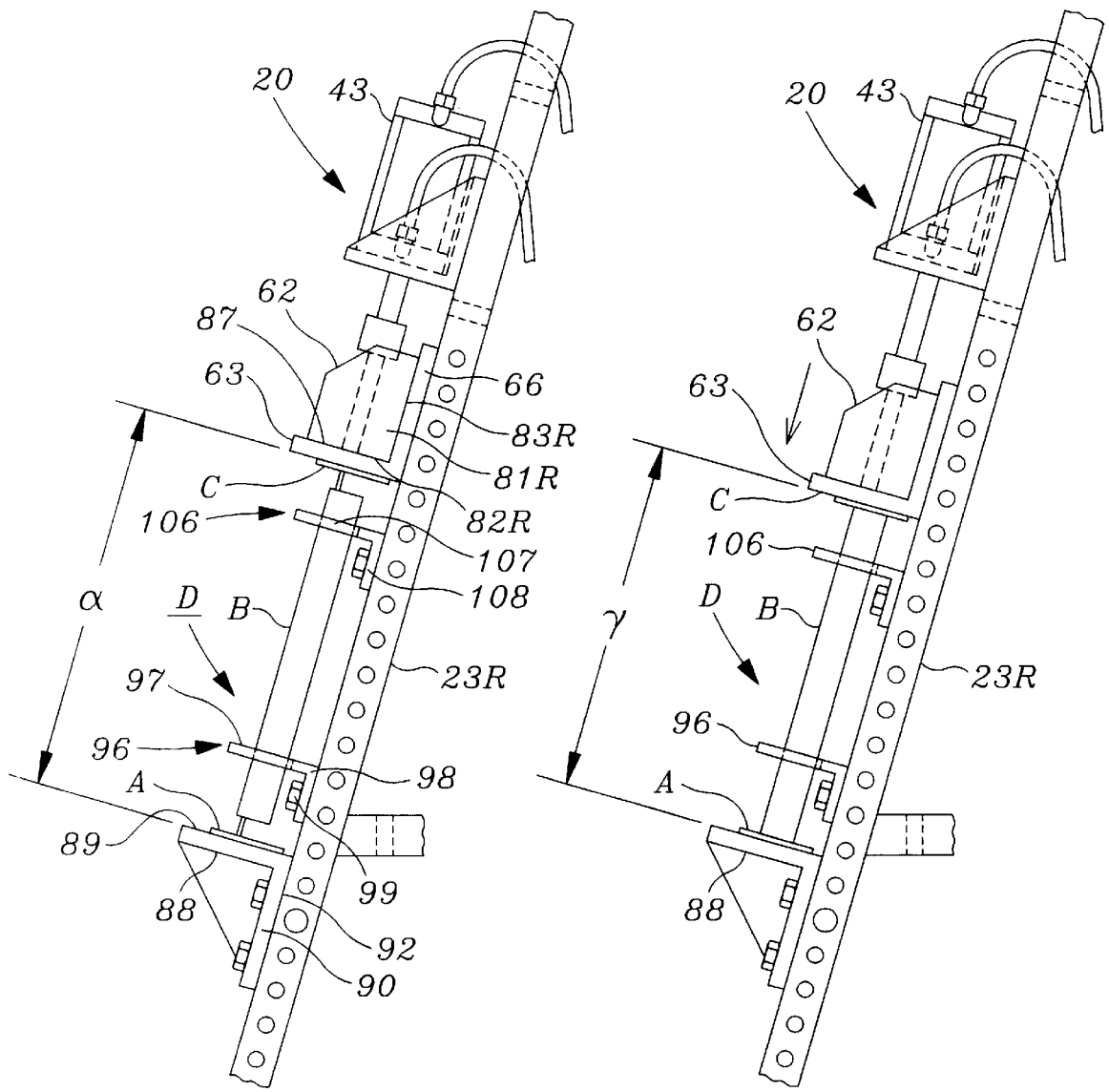
FIG. 4 is a fragmentary side elevation view of the apparatus of FIG. 1, showing the work table thereof elevated to a height suitable to accommodate vanes shorter than shown in FIG. 1, showing a lower rail of a vane and rail structure to be assembled placed on the work table, with vanes resting on tabs protruding upwardly from the lower rail, and showing an upper rail of the vane and rail structure to be assembled placed on top of the vanes.
FIG. 5 is a view similar to that of FIG. 4, but showing a ram plate of the apparatus in a downwardly extended position, in which the upper and lower rails of the vane and rail structure have been compressed together to cause tabs of both upper and lower rails to be fully inserted into and locked within the vanes, thereby completing assembly of the vane and rail structure.
Figure 6:
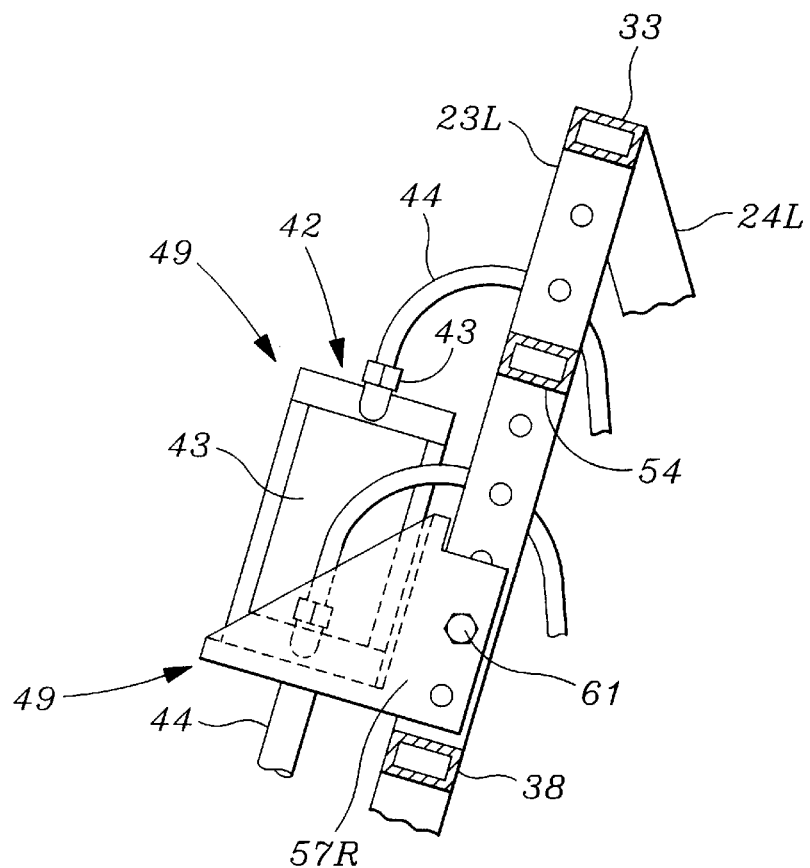
FIG. 6 is a fragmentary longitudinal sectional view of the apparatus of FIG. 1, taken along line 6—6.

With ram 62 constructed as described above, downward motion of the piston within actuator cylinder 43 in response to pressurization of the cylinder causes actuator piston rod 44 and attached ram 63 to move downwards from the position shown in FIG. 4 to the position shown in FIG. 5.

Referring again to FIGS. 1–3, it may be seen that apparatus 20 includes a work table 88 having a flat upper work surface 89 which spans the distance between outer side walls 64L, 64R of front diagonal A-frame members 23L, 23R. As shown in the figures, work table 89 has a laterally elongated rectangular shape, and has protruding perpendicularly downwards from the rear edge wall thereof a laterally elongated, rectangularly-shaped flange section 90. As may be seen best by referring to FIGS. 1 and 3, rear flange section 90 of work table 88 is vertically slidably mounted to bearing rods 68L, 68R by a pair of vertically oriented, laterally spaced apart, linear lower bearing assemblies 91L, 91R which are bolted to the rear surface 92 of the flange section.

As shown in FIGS. 1–3, work table 88 includes a pair of lower laterally spaced apart, vertically disposed tubular uprights 93L, 93R which are bolted to rear surface 92 of work table flange section 90, and which protrude above upper surface 89 of the work table, parallel to and spaced slightly inwards of inner vertical wall surfaces 94L, 94R of front diagonal A-frame members 23L, 23R. As shown in FIG. 3, uprights 93L, 93R each has through its thickness dimension at least one horizontally laterally disposed hole 95L, 95R, having a longitudinal center line aligned with the longitudinal center line of the plurality of longitudinally spaced apart holes 29, 30 disposed transversely through front A-frame diagonal members 23L, 23R. With this arrangement, work table 88 may be slid up or down along bearing rods 68L and 68R to a desired elevation between base beam 34 and cap beam 33 of apparatus 20. Work table 88 may then be secured at the desired elevation by inserting a pair of laterally opposed and aligned pins 96L, 96R through a selected pair of horizontally aligned holes 30L, 30R through front diagonal A-frame members 23L, 23R, inward into holes 95L, 95R through uprights 93L, 93R.

Figure 7:
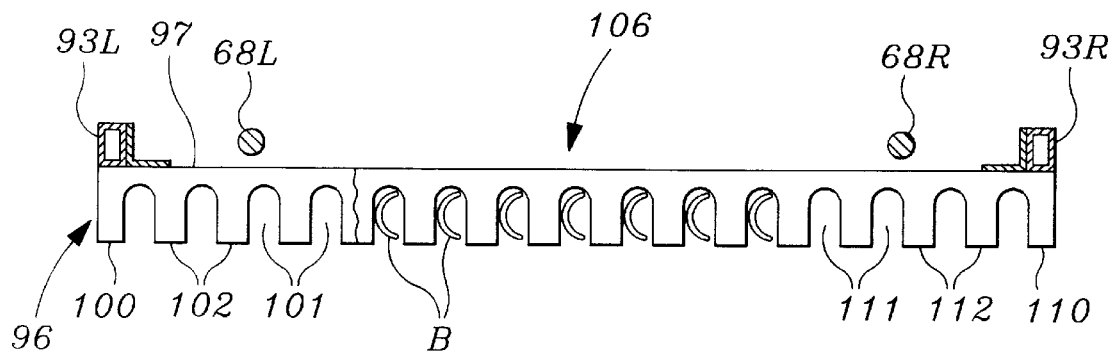
FIG. 7 is a broken transverse sectional view of the apparatus of FIG. 1, taken along line 7—7.

Referring now to FIGS. 1, 4 and 7, it may be seen that apparatus 20 includes a comb-like lower vane guide 96 comprising a laterally elongated slotted plate located above and parallel to upper surface 89 of work table 88. As shown in FIGS. 1, 3 and 7, lower vane guide 96 has a slotted plate section 97 which is parallel to work table surface 89, and which protrudes perpendicularly forward from front wall surfaces 65L, 65R of front diagonal A-frame members 23L, 23R. Lower vane guide 96 also has a rear flange section 98 which protrudes perpendicularly downwards from the rear edge of slotted plate section 97. Rear flange section 98 of lower vane guide 96 is attached at opposite lateral ends thereof to the upper ends of tubular uprights 93L, 93R by bolts 99L, 99R.

As may be seen best by referring to FIGS. 1 and 7, slotted plate section 97 of lower vane guide 96 has a straight front edge wall 100 from which extend inwardly a plurality of laterally symmetric, U-shaped notches 101. Notches 101 are spaced at regular lateral intervals, and alternate with a plurality of tabs 102 comprising uncut web portions of plate section 97, causing the latter to have a comb-like appearance.

As shown FIG. 7, notches 101 of lower vane guide plate section 97 are adapted to receive and maintain in parallel vertical alignment a plurality of air turning vanes B positioned above a lower rail A of an air turning vane and rail structure D to be ultimately assembled.

With lower vane guide 96 fastened to uprights 93 which are in turn fastened to work table 88, the vertical spacing between slotted plate section 97 of the lower vane guide and the work table remain fixed in spite of movement of the work table to a selected elevation.

Referring again to FIGS. 1, 4 and 7, it may be seen that apparatus 20 also includes an upper comb-like vane guide 106, substantially identical in construction and function to lower vane guide 96. Thus, upper vane guide 106 includes a slotted plate section 107 having protruding from the front edge wall 110 thereof a plurality of notches 111 alternating with tabs 112, and a perpendicularly downwardly protruding rear flange section 108. As shown in FIG. 3, upper vane guide 106 is preferably attached to rear support plate 66 of ram 62. Thus, as shown in FIGS. 1 and 3, a pair of laterally opposed, vertically disposed upper tubular uprights 113L, 113R are bolted near the lower ends thereof to rear flange plate 108 of upper vane guide 106, and protrude above the upper surface of slotted plate section 107 of the upper vane guide. Also, uprights 113R are bolted near the upper ends thereof to the rear surface of rear support plate 66 of ram 62. With this arrangement, upper vane guide 106 moves downwardly in unison with ram 62, as shown in FIG. 5.

Figure 9:
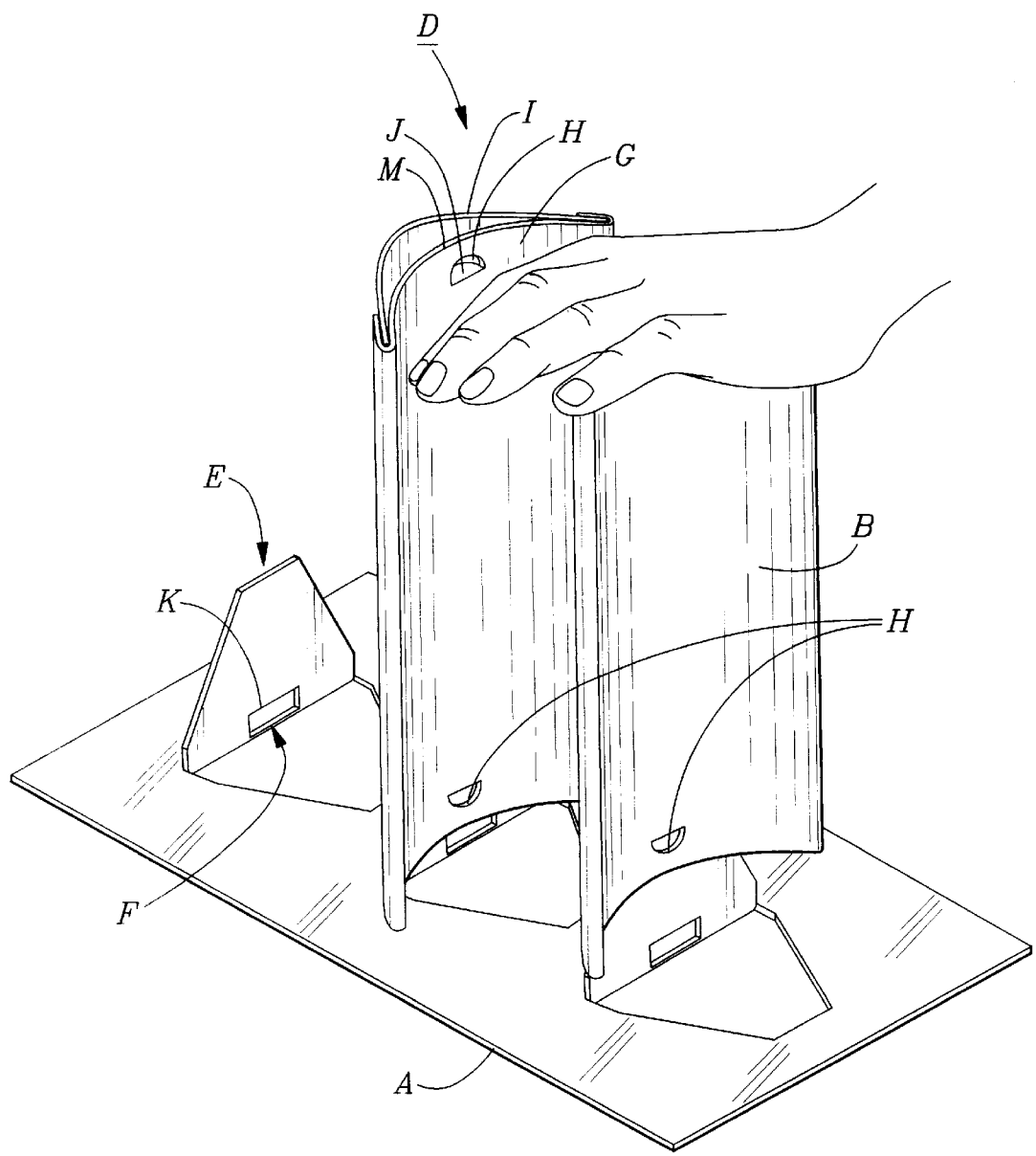
FIG. 9 is a perspective view of vanes placed on a lower rail of a vane and rail sub-assembly.
Figure 10:
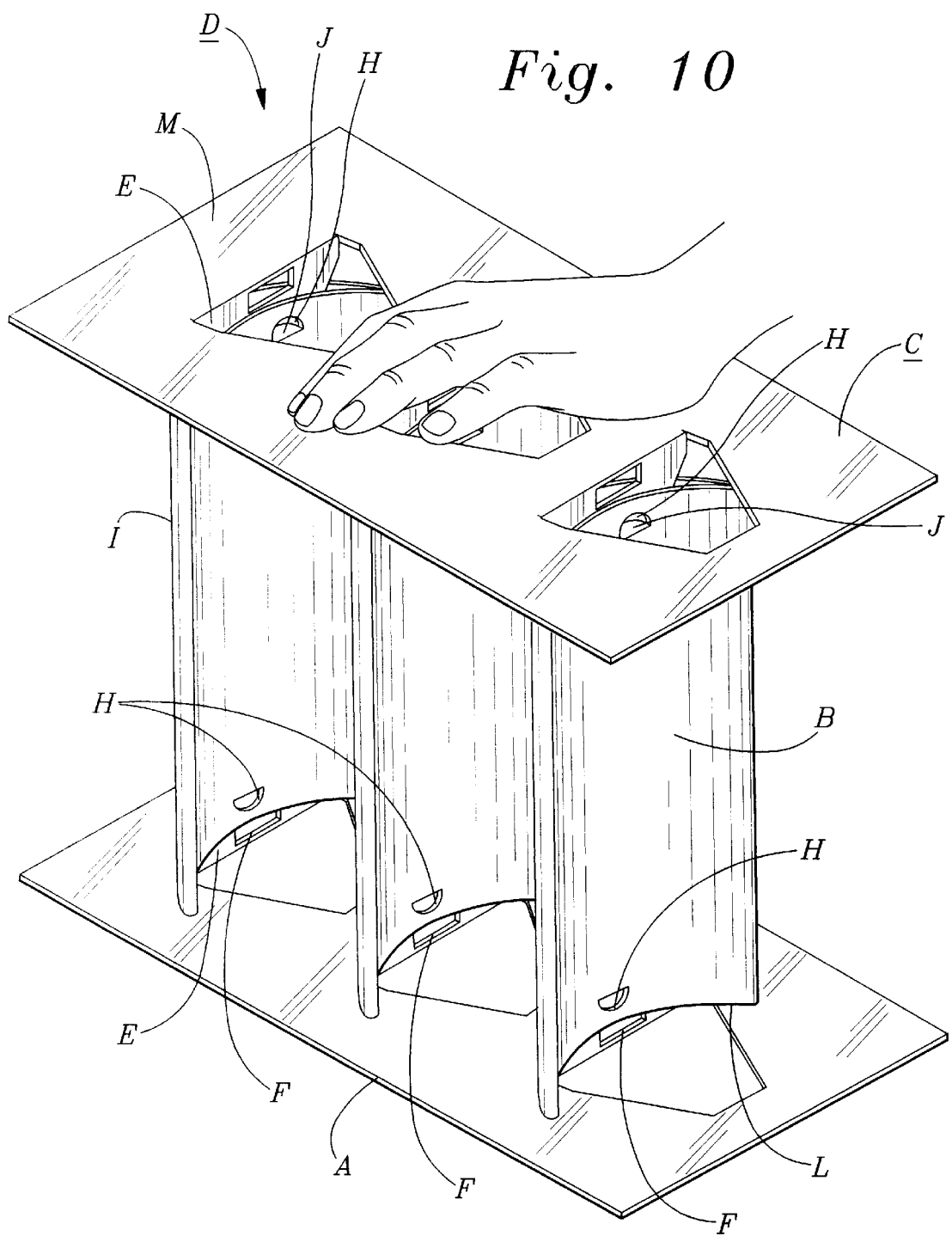
FIG. 10 is a view similar to that of FIG. 10, showing an upper rail placed on the sub-assembly of FIG. 9.

The operation of apparatus 20 in assembling an air turning vane and rail structure may be best understood by referring to FIGS. 9 and 10 in conjunction with FIGS. 1 and 4–6.

FIGS. 9 and 10 illustrate a particular type of vane and rail structure which apparatus 20 is well suited to assembling. As shown in FIGS. 9 and 10, vane and rail structure D comprises a lower elongated plate-like rail A, and upper elongated plate-like rail C disposed parallel to the lower rail, and a plurality of double airfoil turning vanes B spaced apart at regular intervals and disposed perpendicularly between the upper and lower rails.

Figure 11:
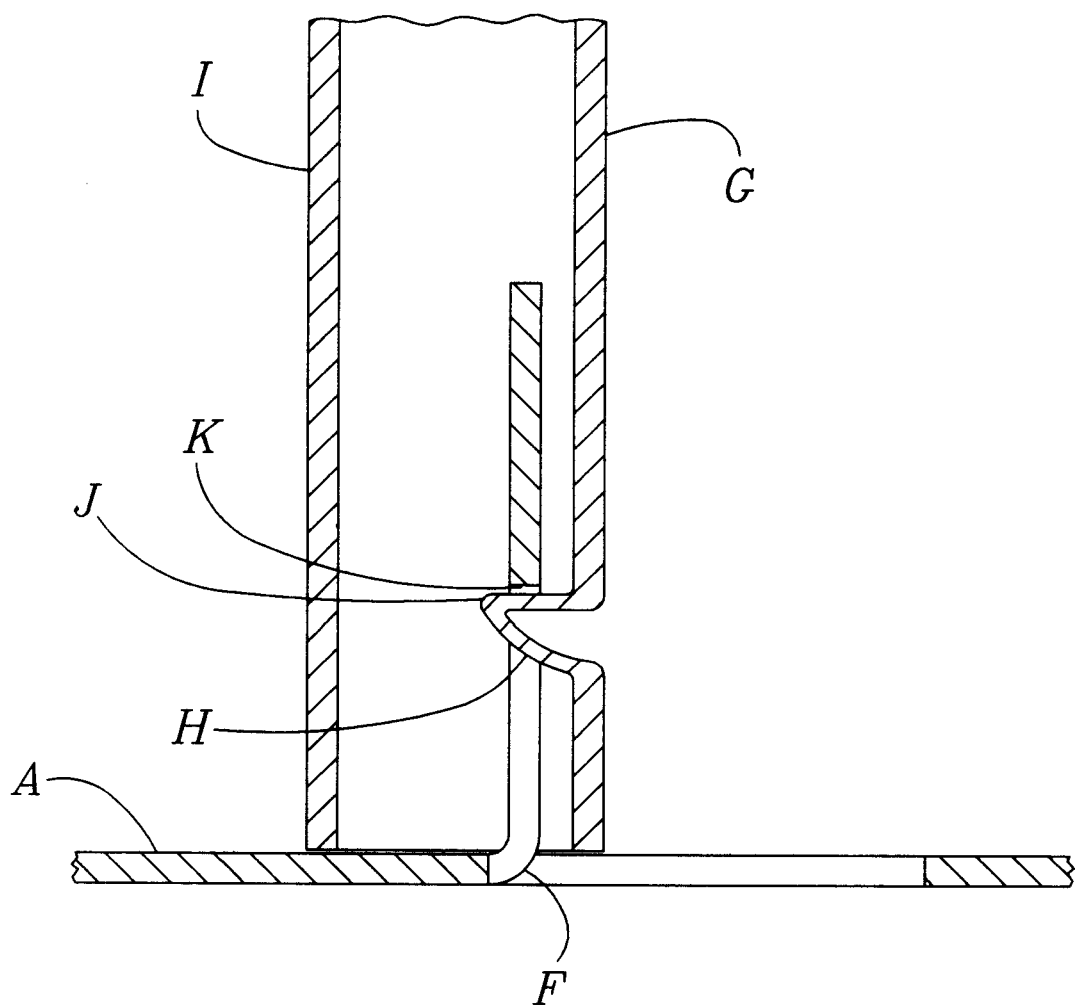
FIG. 11 is a fragmentary sectional view of the vane and rail sub-assembly of FIG. 10, showing a locking protuberance of a vane interlocked within an aperture through a rail tab.

As may be seen best by referring to FIGS. 9 and 10, each rail A and C has formed therein a plurality of trapezoidally-shaped tabs E bent up from perforations through the rail. Each tab E has through its thickness dimension and near its base a rectangularly-shaped aperture F. As may be seen best by referring to FIG. 9, each vane B has formed in the rear concave airfoil plate G thereof a generally hemispherically-shaped protuberance H which protrudes forward towards front convex airfoil plate I thereof. A pair of protuberances H is provided in each airfoil plate I, one such protuberance being located longitudinally inwards from each of the two transverse edges of vane B, ; each protuberance has an inner chordal locking lip or ledge J. Thus, when a tab E is inserted sufficiently far between the front airfoil plate I and rear airfoil plate G, protuberance H springs through tab aperture F. This causes lip J of protuberance H to lock against upper edge K of aperture F, thereby securely fastening a vane to a rail as shown in FIG. 11.

Referring now to FIG. 1, it may be seen that the first step in assembling an air turning vane and rail structure D of the type shown in FIGS. 9 and 10 comprises placing a lower rail A of suitable length on upper surface 89 of work table 88, with each tabs E of the lower rail protruding upwardly and located vertically aligned with a slot 101 of lower vane guide 96. In step two of the assembly process, a separate vane B is placed with the lower opening L thereof on top of a separate tab E, each vane being oriented in a vertical plane and leaning rearwards into a separate slot 101 of lower vane guide 96. Step three of the assembly process comprises positioning an upper rail C above upper vane guide 106, with each tab E of the upper rail protruding downwards an upper opening M of a separate vane B.

FIG. 4 illustrates an arrangement of vanes B and upper and lower rails A and C as described above, positioned on apparatus 20 to comprise a vane and rail structure sub-assembly D prior to step 4 of the assembly operation. In step four, linear actuator cylinder 43 is pressurized, causing ram plate 63 to press forcibly downwards on the upper surface N of upper rail C. This action forces upper downwardly protruding rail tabs E into upper openings M of vanes B, and simultaneously pushes vanes B downwards, forcing upwardly protruding tabs E of lower rail A into lower opening L of vanes B. Since the height of work table upper surface 89 is adjusted to a distance below the lower surface of ram plate 63 at the lower limit of its downward travel, which is equal to the height of the vanes B plus the combined thickness of rails A and C, downward motion of the ram plate causes tabs E to be fully inserted into openings L and M of vanes B, thus causing lip J of each protuberance H to lockingly engage edge wall K of tab aperture F. With a vane and rail structure D fully assembled, as shown in FIG. 5, the piston of linear actuator cylinder 47 is retracted upwardly to its upward rest position. This step enables a finished vane and rail structure D to be pulled forward from vane guides 96 and 106, and removed to complete an assembly cycle.

What is claimed is:

1. An apparatus for assembling air turning vane and rail structures including a plurality of parallel, longitudinally spaced apart air turning vanes attached at opposite transverse edge walls thereof to first and second parallel rails, respectively, by cooperative vane and rail interlocking means which lockably engage when a normal force is exerted on each said rail relative to an adjacent one of said transverse edge walls of each said vane, said apparatus comprising;

a. a work table having an upper surface adapted to support a first, lower rail of a vane and rail structure to be assembled, b. first, lower vane guide means adapted to hold a plurality of longitudinally spaced apart vanes with said vane interlocking means of a lower transverse edge wall of each said vane adjacent one of said cooperative rail interlocking means, c. a ram plate having a lower surface parallel to said first, lower rail on said work table, said ram plate being translatable in a direction perpendicular to said first, lower rail, d. means for supporting a second, upper rail parallel to said first, lower rail with said rail interlocking means adjacent a corresponding cooperative vane interlocking means of an upper transverse edge wall of each of said vanes, and e. means for extending said ram plate downwardly to compress said vanes between said rails sufficiently for said upper vane and rail interlocking means, and said lower vane and rail interlocking means, respectively, to lockingly engage, thereby forming an assembled vane and rail structure, and for retracting said ram plate to permit removal of said vane and rail structure from said apparatus.

2. The apparatus of claim 1 further including second, upper vane guide means adapted to hold said longitudinally spaced apart vanes in a parallel, vertically oriented disposition.

3. The apparatus of claim 2 wherein said upper vane guide means is further defined as being located between said ram plate and said work table.

4. The apparatus of claim 1 further including height adjustment means for adjusting the perpendicular distance between said work table and said ram plate, whereby said apparatus may accommodate vanes of different lengths.

5. The apparatus of claim 4 wherein said height adjustment means is further defined as including means for adjusting the height of said work table.

6. The apparatus of claim 5 wherein said lower vane guide means is rigidly coupled to said work table whereby the height difference between said work table and said lower vane guide means remains fixed.

7. The apparatus of claim 6 wherein said upper vane guide means is rigidly coupled to said ram plate, whereby said upper vane guide means moves reciprocally in unison with said ram plate.

8. The apparatus of claim 1 wherein said cooperative vane and rail interlocking means is further defined as comprising in combination rail interlocking elements consisting of a plurality of longitudinally spaced apart tabs which protrude outwardly from the plane of each said rail and a vane interlocking structure adapted to receive and grip said tabs.

9. The apparatus of claim 8 wherein said vane interlocking structure is further defined as comprising a space between a front, convex and rear, concave airfoil plate of each vane adapted to receive in an interference fit said rail tab.

10. The apparatus of claim 9 wherein each of said rail tabs is further defined as having through the thickness dimension thereof an aperture having a transversely disposed edge wall adapted to lockingly receive a protuberance which protrudes from one of said front and rear airfoil plates towards the other end of said plate of said vane.

11. The apparatus of claim 10 wherein said protuberance is further defined as protruding forward from said rear, concave airfoil plate towards said front, convex airfoil plate, one such protuberance being located inward from each of said upper and lower transverse edge walls of said vane.

12. An apparatus for assembling air turning vane and rail structures including a plurality of longitudinally spaced apart air turning vanes attached at opposite transverse edge walls thereof to first and second parallel rails, respectively, by interlockable vane and rail means which lockably engage one another when a normal force is exerted on each said rail relative to an adjacent one of said transverse edge walls of each said vane, said apparatus comprising;
 a. a support structure,
 b. a work table attached to and protruding forward from said support structure and having a laterally disposed upper surface adapted to support a first, lower rail of a vane and rail structure to be assembled,
 c. a first, lower laterally disposed vane guide located above said work table, said lower vane guide having a plurality of longitudinally spaced apart slots protruding inwards from a front edge wall thereof, each of said slots adapted to receive a separate one of a plurality of vanes in an upright position relative to a lower rail located on said work table,
 d. a second, upper laterally disposed vane guide located above said lower vane guide, said upper vane guide having a plurality of slots protruding inward from a front edge wall thereof, each of said slots being centered on a vertical plane centered on a corresponding slot of said lower vane guide, said slots of said upper vane guide adapted to receive upper portions of said vanes,
 e. a ram plate having a lower surface parallel to said upper surface of said work table, and
 f. means for extending said ram plate downwardly to compress a said upper rail placed parallel to said lower rail and above the upper transverse edge walls of said vanes, sufficiently for said upper vane and rail interlocking means, and said lower vane and rail interlocking means, respectively, to lockingly engage thereby forming an assembled vane and rail structure, and for retracting said ram plate to permit removal of said vane and rail structure from said apparatus.

13. The apparatus of claim 12 wherein said work table is further defined as being attached to said support structure by fastening means which permit adjusting the height of said work table relative to that of said ram plate, whereby said apparatus may accommodate vanes of different lengths.

14. The apparatus of claim 13 wherein said lower vane guide is further defined as being rigidly coupled to said work table, whereby the height difference between said work table and said lower vane guide remains fixed as said height of said work table is adjusted.

15. The apparatus of claim 13 wherein said upper vane guide is further defined as being rigidly coupled to said ram plate, whereby said upper vane guide moves reciprocally in unison with said ram plate.

16. An apparatus for assembling air turning vane and rail structures, including a plurality of longitudinally spaced apart air turning vanes, each comprising a front convex and a rear concave airfoil plate and attached at opposite transverse edge walls thereof to first and second parallel rails, respectively, by means of a separate one of a plurality of longitudinally spaced apart tabs which protrude outwardly from the plane of said rails and which interlock with said vanes when inserted forcibly between said front and rear airfoil plates, said apparatus comprising;
 a. a support structure including a front frame,
 b. a work table disposed laterally across said frame and protruding perpendicularly outwardly from the plane thereof, said work table having a laterally disposed upper surface adapted to support a first, lower rail of a vane and rail structure to be assembled,
 c. a first, lower laterally disposed vane guide protruding outwardly from said frame parallel to and above said work table, said lower vane guide including a laterally disposed plate having a plurality of laterally spaced apart slots protruding inwardly from a front edge wall thereof, each of said slots adapted to receive a separate one of a plurality of vanes in an upright position above and aligned with a separate one of said tabs protruding upwardly from a rail located on said upper surface of said work table,
 d. a second, upper laterally disposed vane guide protruding outwardly from said frame parallel to and above said lower vane guide and work table, said upper vane guide including a laterally disposed plate having a plurality of laterally spaced apart slots protruding inwardly from a front edge wall thereof, each of said slots adapted to receive an upper portion of a separate one of said vanes received in said slots of said lower vane guide,
 e. a ram plate longitudinally slidably mounted to said frame, said ram plate having a lower surface parallel to said upper surface of said work table, and f. actuator means for extending said ram plate longitudinally downwardly to force said upper rail downwardly with respect to said work table and lower rail thereon, thereby lockably inserting said downwardly protruding tabs of said upper rail into corresponding openings in the upper transverse edge walls of said vanes, and lockably forcing said upwardly protruding tabs of said lower rail upwardly into corresponding openings in the lower transverse edge walls of said vanes.

17. The apparatus of claim 16 wherein said upper vane guide is further defined as being longitudinally slidably mounted to said frame.

18. The apparatus of claim 17 further including coupling means maintaining a fixed height difference between said ram plate and said upper vane guide.

19. The apparatus of claim 18 wherein said work table is further defined as being longitudinally slidably mounted to said frame.

20. The apparatus of claim 19 wherein said frame is further defined as including a pair of laterally spaced apart bearing rods disposed longitudinally and parallel to said frame, said bearing rods longitudinally slidably supporting said work table and said ram plate.

21. The apparatus of claim 20 wherein said frame is further defined as having a vertically elongated rectangular shape.

22. The apparatus of claim 21 wherein said support structure is further defined as including frame support means for supporting said frame with said work table disposed horizontally with the upper portion of said frame tilted rearwardly.

23. The apparatus of claim 22 wherein said frame support means is further defined as comprising in combination left and right parallel vertically disposed A-frames attached to left and right sides of said front frame.

* * * * *